(12) United States Patent
Katoh et al.

(10) Patent No.: US 7,850,789 B2
(45) Date of Patent: Dec. 14, 2010

(54) PASTY COMPOSITION FOR ALUMINUM BRAZING, ALUMINUM-CONTAINING MEMBER COATED WITH THE SAME, AND METHOD FOR BRAZING ALUMINUM-CONTAINING MEMBERS WITH THE SAME

(75) Inventors: Haruzo Katoh, Osaka (JP); Takashi Watsuji, Osaka (JP); Ken Matsumura, Osaka (JP)

(73) Assignee: Toyo Aluminium Kabushiki Kaisha, Osaka (JP)

( * ) Notice: Subject to any disclaimer, the term of this patent is extended or adjusted under 35 U.S.C. 154(b) by 421 days.

(21) Appl. No.: 12/084,788

(22) PCT Filed: Mar. 20, 2007

(86) PCT No.: PCT/JP2007/055602

§ 371 (c)(1),
(2), (4) Date: May 9, 2008

(87) PCT Pub. No.: WO2007/114040

PCT Pub. Date: Oct. 11, 2007

(65) Prior Publication Data

US 2009/0233118 A1 Sep. 17, 2009

(30) Foreign Application Priority Data

Apr. 3, 2006 (JP) ............................. 2006-101331

(51) Int. Cl.
*B22F 1/00* (2006.01)
*B23K 35/24* (2006.01)
*C22C 21/02* (2006.01)

(52) U.S. Cl. .......................... 148/24; 75/252; 228/256; 428/553

(58) Field of Classification Search ................... 75/252; 148/23, 24; 228/256, 262.51; 428/553
See application file for complete search history.

(56) References Cited

U.S. PATENT DOCUMENTS

| | | | |
|---|---|---|---|
| 3,667,111 A * | 6/1972 | Chartet ...................... 228/224 |
| 4,981,526 A * | 1/1991 | Kudo et al. ................... 148/25 |
| 5,173,126 A * | 12/1992 | Ogura et al. ................. 148/23 |
| 5,820,698 A * | 10/1998 | Tohma et al. ................ 148/24 |
| 6,113,667 A | 9/2000 | Hyogo et al. |
| 6,153,021 A | 11/2000 | Suzuki et al. |
| 6,203,628 B1 | 3/2001 | Katoh et al. |
| 6,409,074 B1 | 6/2002 | Katoh et al. |
| 2002/0005230 A1 | 1/2002 | Watsuji et al. |

FOREIGN PATENT DOCUMENTS

| | | | |
|---|---|---|---|
| JP | 8-25079 A | 1/1996 |
| JP | 9-85483 A | 3/1997 |
| JP | 9-239529 A | 9/1997 |
| JP | 10-323792 A | 12/1998 |
| JP | 2000-141083 A | 5/2000 |
| JP | 2001-225185 A | 8/2001 |
| JP | 2001-293593 A | 10/2001 |
| JP | 2003-334690 A | 11/2003 |

* cited by examiner

*Primary Examiner*—Roy King
*Assistant Examiner*—Ngoclan T Mai
(74) *Attorney, Agent, or Firm*—Birch, Stewart, Kolasch & Birch, LLP

(57) ABSTRACT

Provided are a pasty composition for aluminum brazing which has excellent coating properties, is capable of attaining favorable dimensional accuracy of products obtained after brazing, causes less erosion, and allows favorable external appearances of brazed portions (fillets); an aluminum-containing member coated with the pasty composition for aluminum brazing; and a method, using the pasty composition for aluminum brazing, for brazing the aluminum-containing members. The pasty composition for aluminum brazing contains an aluminum-containing powder. In a case where on a cumulative grading curve of the aluminum-containing powder, a particle diameter D µm which corresponds to a Q volume % is indicated as D(Q) µm, D(50) µm is greater than or equal to 20 µm and less than or equal to 150 µm; and D(90) µm/D(10) µm is less than or equal to 5. A mass percentage of particles, in the aluminum-containing powder, which pass through a screen mesh having an opening of 45 µm is less than or equal to 50%. A flowability of the aluminum-containing powder is less than or equal to 80 seconds/50 g.

8 Claims, 1 Drawing Sheet

US 7,850,789 B2

PASTY COMPOSITION FOR ALUMINUM BRAZING, ALUMINUM-CONTAINING MEMBER COATED WITH THE SAME, AND METHOD FOR BRAZING ALUMINUM-CONTAINING MEMBERS WITH THE SAME

TECHNICAL FIELD

The present invention relates generally to pasty compositions for aluminum brazing, aluminum-containing members coated with the pasty compositions for aluminum brazing, and methods, using the pasty compositions for aluminum brazing, for brazing the aluminum-containing members. More particularly, the present invention relates to a pasty composition, used when aluminum-containing members are joined with each other by brazing, which includes an aluminum-containing powder as a brazing filler metal powder.

BACKGROUND ART

Conventionally, a brazing sheet is used for brazing aluminum-containing members. As a brazing sheet, clad metal produced by joining brazing filler metal such as a 4343 alloy (hereinafter, four characters consisting of digits or of digits and a letter (or letters) indicate those defined by JIS) and a 4045 alloy on one side or both sides of a core material such as a 3003 alloy and a 3N03 alloy is used. When brazing is conducted by using such a brazing sheet, the brazing filler metal is joined also on portions other than portions which should be brazed. This causes a manufacturing cost of an end product to be increased. In addition, there is a limit to a thickness due to manufacturing reasons, so that clad metal used as the brazing sheet has to have a thickness of at least approximately 60 μm. It is extremely difficult to manufacture clad metal having a thickness thinner than the above-mentioned thickness due to industrial reasons. Even if the clad metal having the thickness thinner than the above-mentioned thickness can be manufactured, a thickness of a skin material is not uniform, thereby failing to attain stable quality and properties.

In recent years, there has been proposed a method in which without using the brazing sheet, brazing is conducted by coating a mixture of an aluminum-silicon-based brazing filler metal powder and flux on portions of aluminum-containing members, which are to be brazed.

In Japanese Patent Application Laid-Open Publication No. 2003-334690 (Patent Document 1), aluminum alloy powder brazing filler metal which contains 4 to 13% by mass of Si and 0.5 to 20% by mass of Zn, whose remainder includes Al and an impurity, and which has an average particle diameter of 1 to 100 μm is described.

In Japanese Patent Application Laid-Open Publication No. 10-323792 (Patent Document 2), an aluminum alloy powder brazing filler metal comprising: a powder obtained by mixing an Al—Si—Zn ternary hypereutectic alloy powder which contains 13 to 45% of Si and 6 to 35% of Zn, whose remainder has composition of Al and an enevitable impurity, and which has an average particle diameter is 5 to 100 μm; and an Si powder which has an average particle diameter of 5 to 50 μm is described.

Further, in Japanese Patent Application Laid-Open Publication No. 2001-293593 (Patent Document 3), a pasty composition for aluminum brazing obtained by mixing a pure aluminum powder whose brazing metal powder has an average particle diameter of greater than or equal to 1 μm and less than 10 μm and a silicon power which has an average particle diameter of greater than or equal to 0.1 μm and less than 10 μm is described. When these conventional brazing filler metal powders for aluminum brazing are used, there have accrued problems that dimensional accuracy of products obtained after the brazing are still insufficient and that erosion (a deterioration in a surface roughness) is caused.

Patent Document 1: Japanese Patent Application Laid-Open Publication No. 2003-334690
Patent Document 2: Japanese Patent Application Laid-Open Publication No. 10-323792
Patent Document 3: Japanese Patent Application Laid-Open Publication No. 2001-293593

DISCLOSURE OF THE INVENTION

Problems to be Solved by the Invention

Therefore, an object of the present invention is to provide a pasty composition for aluminum brazing which has excellent coating properties, is capable of attaining favorable dimensional accuracy of products obtained after brazing, causes less erosion, and allows favorable external appearances of brazed portions (fillets); an aluminum-containing member coated with the pasty composition for aluminum brazing; and a method, using the pasty composition for aluminum brazing, for brazing the aluminum-containing members.

Means for Solving the Problems

The present inventors have devoted themselves to studies. As a result, the present inventors have found that the above-mentioned problems can be solved by limiting grading properties and flowability of a brazing filler metal powder. Based on such findings obtained by the present inventors, the present invention was completed.

A pasty composition for aluminum brazing according to the present invention contains an aluminum-containing powder. In a case where on a cumulative grading curve plotted in a graph in which Q volume % showing a percentage of a volume of particles, in the aluminum-containing powder, whose particle diameter is each less than or equal to D μm is represented with a horizontal axis showing D μm and a vertical axis showing Q volume %, the particle diameter D μm which corresponds to the Q volume % is indicated as $D(Q)$ μm, $D(50)$ μm is greater than or equal to 20 μm and less than or equal to 150 μm; and $D(90)$ μm/$D(10)$ μm is less than or equal to 5. A mass percentage of particles, in the aluminum-containing powder, which pass through a screen mesh having an opening of 45 μm is less than or equal to 50%. A flowability of the aluminum-containing powder is less than or equal to 80 seconds/50 g.

It is preferable that the pasty composition for aluminum brazing of the present invention contains the aluminum-containing powder of greater than or equal to 10% by mass and less than or equal to 70% by mass, a fluoride-based flux of greater than or equal to 2% by mass and less than or equal to 50% by mass, and a binder of greater than or equal to 1% by mass and less than or equal to 15% by mass, and a remainder thereof includes substantially an organic solvent.

It is preferable that in the pasty composition for aluminum brazing of the present invention, the binder contains at least one selected from the group consisting of a butyl rubber, a petroleum resin, an acrylic resin, and an alkyd resin.

It is preferable that in the pasty composition for aluminum brazing of the present invention, the aluminum-containing powder is one of an aluminum-silicon-based alloy powder and an aluminum-silicon-zinc-based alloy powder.

In the pasty composition for aluminum brazing of the present invention, the aluminum-containing powder may be one of a mixed powder of an aluminum powder and a silicon powder; and a mixed powder of an aluminum powder, a silicon powder, and a zinc powder.

It is preferable that the pasty composition for aluminum brazing of the present invention further contains a coupling agent.

An aluminum-containing member of the present invention is coated, on a surface of at least one portion thereof, with the pasty composition for aluminum brazing, which has at least any of the above-described features.

In a method for brazing aluminum-containing members according to the present invention, the pasty composition for aluminum brazing is applied on a surface of at least one portion of one of the aluminum-containing members and thereafter, the one and the other of the aluminum-containing members are brazed.

Effect of the Invention

By using the pasty composition for aluminum brazing of the present invention, an external appearance of a fillet obtained after brazing can be made favorable without causing black-tarnishing and leaving white residues. When brazing is conducted by using the pasty composition for aluminum brazing of the present invention, since a favorable state of a coating film can be obtained even after drying, dust or the like is not generated, making a work environment favorable. Furthermore, since a brazing method of the present invention does not require an extra apparatus or device, the brazing method can be implemented by using the existing equipment.

EXPLANATION OF REFERENCE NUMERALS

Figure 1:
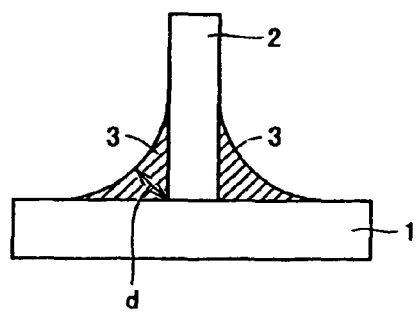
FIG. 1 is a schematic diagram showing a sectional view of a portion at which a fillet has been formed after brazing.

1: coated plate, 2: aluminum plate, 3: fillet

BEST MODE FOR CARRYING OUT THE INVENTION

Hereinafter, an embodiment of the present invention will be described in detail.

(Aluminum-Containing Powder)

A favorable aluminum-containing powder is a powder obtained by employing a gas atomization technique (gas atomizing) using an argon gas or a nitrogen gas.

On a cumulative grading curve plotted in a graph in which Q volume % showing a percentage of a volume of particles, in the aluminum-containing powder, whose particle diameter is less than or equal to D μm is represented with a horizontal axis showing D μm and a vertical axis showing Q volume %, the particle diameter D μm which corresponds to the Q volume % is indicated as D(Q) μm.

An aluminum-containing powder of the present invention has D(50) μm of greater than or equal to 20 μm and less than or equal to 150 μm, and favorably, has D(50) μm of greater than or equal to 50 μm and less than or equal to 100 μm. If the aluminum-containing powder has D(50) μm of less than 20 μm, an oxygen content is more likely to be increased and agglomeration of the aluminum-containing particles occurs in a pasty composition, thereby causing smoothness of a paste to be lost and deteriorating coating properties. Furthermore, in order to obtain favorable brazing properties, it is required to add a large amount of flux, thereby increasing a manufacturing cost. On the other hand, if D(50) μm exceeds 150 μm, a thickness of a coating film obtained after coating is increased more than necessary, whereby dimensional accuracy of products obtained after the brazing are likely to be worsened and evenness in a pasty composition is likely to be impaired.

The aluminum-containing powder of the present invention has a value of D(90) μm/D(10) μm of greater than or equal to 1 and less than 5, and favorably, has a value of D(90) μm/D(10) μm of less than or equal to 3. If the value of D(90) μm/D(10) μm of the aluminum-containing powder exceeds 5, coating properties are deteriorated, whereby dimensional accuracy of products obtained after the brazing are likely to be worsened and evenness in a pasty composition is likely to be impaired.

In order to control a powder particle size in a rage of greater than or equal to 20 μm and less than or equal to 150 μm as D(50) μm of the aluminum-containing powder and in a range of less than or equal to 5 as D(90) μm/D(10) μm of the aluminum-containing powder, it is preferable that a pressure of a gas used in the gas atomization technique is controlled to be less than or equal to 10 kgf/cm² and a gas/metal ratio is controlled to be less than or equal to 5. It is more preferable that the pressure of the gas is 5 to 7 kgf/cm². It is preferable that the gas/metal ratio is greater than or equal to 1/1000 and less than or equal to 3.

The gas/metal ratio cited here is a value obtained by dividing a flow rate of the gas used in the gas atomization technique by a flow rate of aluminum-containing molten metal used in the gas atomization technique and represented by the following equation.

Gas/metal ratio=flow rate of gas (kg/h)/flow rate of aluminum-containing molten metal (kg/h)

The aluminum-containing powder of the present invention has V(−45) (a mass percentage of particles which pass through a screen mesh having an opening of 45 μm) of less than or equal to 50% and a flowability of less than or equal to 80 second/50 g. It is preferable that V(−45) is less than or equal to 30% and a flowability is less than or equal to 60 second/50 g. If the V(−45) exceeds 50%, the particles agglomerate in a pasty composition, resulting in lost smoothness of a paste and deteriorated coating properties, whereby adverse effects such as a fracture of brazing filler metal and unstable formation of fillets are likely to be exerted. If the flowability exceeds 80 seconds/50 g, coating properties are deteriorated, thereby worsening dimensional accuracy of products obtained after the brazing. In order to control V(−45) and the flowability within the above-mentioned favorable ranges, it is favorable that a particle size distribution of the aluminum-containing powder is adjusted by sieving (classifying).

A preferable oxygen content contained in the aluminum-containing powder, though depending on a particle size and shape thereof, is less than or equal to 1.5% by mass. If the oxygen content exceeds 1.5% by mass, an oxide film is thickened, whereby insufficient melting is likely to be caused, and through mixing a large amount of flux, external appearances obtained after the brazing are likely to be worsened.

As the aluminum-containing powder of the present invention, in addition to a pure aluminum powder, an aluminum-silicon-based alloy powder or an aluminum-silicon-zinc-based alloy powder may be used. As the aluminum-containing powder, a powder obtained by mixing a pure aluminum powder and a silicon powder or a powder obtained by mixing the pure aluminum powder, a silicon powder, and a zinc powder may be suitably used.

The above-mentioned pure aluminum powder, an aluminum alloy powder, a silicon powder, and a zinc powder can be obtained mainly by the gas atomization technique, a crushing technique, a rotating disk technique, a cavitation technique, a melt-spinning technique, etc. or a technique of combining these techniques. Of course, as these powders, commercially-available powders may be picked out for use. A particle shape of these powders may be globular, flat, tabular, teardrop-like, needle-like, spheroidal, amorphous, etc., and whichever the shape may be, no problem accrues at all.

It is appropriate that an amount of the silicon contained in the aluminum alloy powder or, in a case where the mixed powder is used, an amount of the silicon powder contained in the mixed powder is in a range of 5 to 85% by mass as a ratio to 100% by mass of a metal component. When the silicon is contained in the aluminum-containing powder, it is preferable to use the mixed powder. This is because when the aluminum and the silicon are alloyed in composition within the above-mentioned range, a melting point is low and flowability in a molten state is favorable. In particular, at a temperature greater than or equal to an eutectic point (with an approximately 12% by mass of the silicon in an equilibrium diagram), through alloying with an aluminum member, melting occurs at a brazing temperature, thereby further enhancing fluidization. In particular, when the mixed powder is used, it is recommendable to use a pure aluminum powder having a purity of greater than or equal to 99.0% by mass, or favorably, of greater than or equal to 99.7% by mass and a silicon powder having a purity of greater than or equal to 90.0% by mass, or favorably, of greater than or equal to 97.0% by mass. It is not favorable to use the pure aluminum powder and the silicon powder which have the purities less than the above-mentioned purities because a content of iron which is an impurity is increased and thereby, a corrosion resistance after the brazing is reduced. A favorable average particle diameter of the silicon powder is greater than or equal to 0.1 μm and less than 10 μm. It is not favorable to use the silicon powder having the average particle diameter of less than 0.1 μm because not only an oxygen content is increased but also agglomeration in a pasty composition easily occurs. On the other hand, it is not favorable to use the silicon powder having the average particle diameter of greater than or equal to 10 μm because evenness in a pasty composition is likely to be impaired and erosion on an aluminum member is likely to be caused.

The aluminum-containing powder of the present invention may contain zinc in order to attain a sacrificial protection effect. It is only required that an amount of the zinc contained in the aluminum alloy powder or, in a case where a mixed powder is used, an amount of a zinc powder contained in the mixed powder is 0.5 to 60% by mass or favorably, 10 to 50% by mass as a ratio to 100% by mass of a metal component. A favorable average particle diameter of the zinc powder is greater than or equal to 0.1 μm and less than 10 μm. It is not favorable to use the zinc powder having the average particle diameter of less than 0.1 μm because not only an oxygen content is increased but also agglomeration in a pasty composition easily occurs. On the other hand, it is not favorable to use the zinc powder having the average particle diameter of greater than or equal to 10 μm because a thickness of a coating film obtained after coating is increased more than necessary, whereby dimensional accuracy of products obtained after the brazing are likely to be worsened and evenness in a pasty composition is likely to be impaired. When a mixed powder is used, it is recommendable to use a zinc powder having a purity of greater than or equal to 90.0% by mass, or favorably, of greater than or equal to 97.0% by mass. It is not favorable to use the zinc powder having the purity of less than 90% by mass because a content of Pb (lead) which is an impurity is increased and thereby, a corrosion resistance after the brazing is reduced.

In addition, other elements may be added. According to need, it is possible to add approximately less than or equal to 5% by mass of one or more kinds of elements such as Cu, Mg, Bi, Sb, and Ba as a ratio to 100% of a metal component. These elements may be added as alloy elements contained in the aluminum alloy powder or as a powder of a simple substance contained in a mixed powder.

It is recommendable that an amount of the aluminum-containing powder contained in the pasty composition for aluminum brazing of the present invention is 10 to 70% by mass or favorably, 20 to 60% by mass as a ratio to 100% by mass of an entire composition. If the amount of the aluminum-containing powder is less than 10% by mass, performance as the brazing filler metal is made inferior and it is likely to fail to form favorable fillets. On the other hand, if a content of the aluminum-containing powder exceeds 70% by mass, overabundance results and required amounts of the flux and the binder are increased, thereby leading to an increase in a manufacturing cost.

(Fluoride-Based Flux)

As an example of a fluoride-based flux contained in the pasty composition for aluminum brazing of the present invention, a fluoride-based flux such as $AlF_3$—KF, $KAlF_4$—$K_3AlF_6$, $K_3AlF_6$, and $KAlF_4$ can be cited. A commercially available product "Nocolok (trade name)" (manufactured by Alcan Inc.) of which chief ingredients are $K_3AlF_6$ and $KAlF_4$ is especially suitable. An amount of the fluoride-based flux contained in the pasty composition for aluminum brazing of the present invention is approximately 2 to 50% by mass or preferably, 5 to 30% by mass. If a content of the fluoride-based flux is less than 2% by mass, it is difficult to obtain sufficient flux action. On the other hand, if the content of the fluoride-based flux exceeds 50% by mass, overabundance results, thereby leading to an increase in a manufacturing cost.

(Binder)

As a resin/rubber acting as a binder in the pasty composition for aluminum brazing, a binder containing at least one selected from the group consisting of a butyl rubber, a petroleum resin, an acrylic resin, and an alkyd resin can be used. A butyl rubber which is a copolymer of isobutylene and isoprene and has a molecular weight of 250,000 to 500,000 is preferable. As the petroleum resin, one or more kinds of C5 petroleum resin, C9 petroleum resin, and C5/C9 copolymerized petroleum resin can be used, and a favorable molecular weight thereof is approximately 600 to 2,000.

As the acrylic resin, a copolymer of an acrylic monomer and other ethylene unsaturated monomer can be cited. As the acrylic monomer which can be used in the above-mentioned copolymer, an ester compound such as methyl, ethyl, propyl, n-butyl, i-butyl, t-butyl, 2-ethylhexyl, lauryl, phenyl, benzyl, 2-hydroxy-ethyl, 2-hydroxy-propyl of acrylic acid or methacrylic acid; an ring-opening addition compound such as caprolactone of 2-hydroxy-ethyl of acrylic acid or methacrylic acid; glycidyl of acrylic acid or methacrylic acid; polyalcohol (metha) acrylic acid ester; etc. can be cited. As the ethylene unsaturated monomer which can be copolymerized with these acrylic monomers, styrene, α-methyl styrene, itaconic acid, maleic acid, vinyl acetate, etc. can be cited. In particular, an ethylene unsaturated monomer having a molecular weight of 100 to 1,000,000 is suitable.

As the alkyd resin, a alkyd resin which is obtained by conducting denaturation through reacting, with polybasic acid and polyalcohol, a denaturant such as oil and fat/oil and fat fatty acid (soya bean oil, linseed oil, coconut oil, stearic acid, etc.) and natural resin (rosin, amber, etc.) can be used. As the polybasic acid, for example, saturated polybasic acid such as phthalic anhydride, terephthalic acid, and succinic acid; and unsaturated polybasic acid such as maleic acid, maleic anhydride, fumaric acid; etc. can be cited. As the polyalcohol, for example, dihydric alcohol such as ethylene glycol and diethylene glycol; trihydric alcohol such as glycerin and trimethylolpropane; etc. can be cited.

As a content of the binder contained in the pasty composition for aluminum brazing of the present invention, 1 to 15% by mass is preferable and 2 to 10% by mass is more preferable. It is not preferable that the content of the binder is less than 1% by mass because a viscosity of a flux composition is low, thereby causing sagging when the pasty composition for aluminum brazing is applied on an aluminum-containing member and worsening adhesion with the aluminum-containing member. On the other hand, if the content of the binder exceeds 15% by mass, overabundance results, thereby leading to an increase in a manufacturing cost.

An organic solvent contained in the pasty composition for aluminum brazing of the present invention is not particularly limited and is only required to be capable of solving the above-mentioned binder. Toluene, hexane, octane, cyclohexane, etc. can be used alone or alternatively, two or more selected from toluene, hexane, octane, cyclohexane, etc. can be used in combination by mixing. The organic solvent is only required to appropriately adjust a viscosity or the like of the pasty composition. Specifically, it is recommended that a content of the organic solvent is adjusted in a range of 0.1 to 87% by mass, or preferably, of 5 to 70% by mass.

To the pasty composition for aluminum brazing of the present invention, heretofore known additives may be added. For example, an antiforming agent, a leveling agent, a thixotropic agent, a surface activating agent, a pigment moistening agent, a plasticizer, a dispersant, a lubricant, a light stabilizer, a tackifier, a coupling agent, etc. may be added according to need. In particular, the coupling agent is effective in order to enhance adhesion of a coating film and it is effective to add approximately 0.001 to 1.0% by mass thereof. A titanate-based coupling agent, among others, is especially effective.

As the antifoaming agent and the leveling agent, for example an acrylic antifoaming agent, an acrylic leveling agent, a vinyl-based antifoaming agent, a vinyl-based leveling agent, a silicone-based antifoaming agent, a silicone-based leveling agent, mineral-based antifoaming agent, a thixotropic agent (a viscosity improver, an anti-settling agent, an anti-sagging agent), etc. can be cited. One kind or two or more kinds of these can be used.

A form of the thixotropic agent is not particularly limited. A solvent-type thixotropic agent, a water-type thixotropic agent, etc. can be cited.

As the solvent-type thixotropic agent, for example, a thixotropic agent for an inorganic particle solvent such as an organic bentonite-based thixotropic agent, a superfine-silica-based thixotropic agent, a surface-treated-calcium-carbonate-based thixotropic agent, etc.; and a thixotropic agent for an organic solvent such as an amide-wax-based thixotropic agent, a hydrogenated castor-oil-wax-based thixotropic agent, a dibenzylidene-sorbitol-based thixotropic agent, a metal soap (stearic acid zinc, stearic acid aluminum, etc.) a polyethylene-oxide-based thixotropic agent, a polymer-vegetable oil-based thixotropic agent, a sulfate-anion-surface activating agent-based thixotropic agent, a polyether/ester-surface activating agent-based thixotropic agent, a polycarboxylic amine-based thixotropic agent, etc. can be cited. One kind or two or more kinds of these can be used.

As the water-type thixotropic agent, for example, an inorganic water-type thixotropic agent of fine particles such as a superfine-particle-silica-based thixotropic agent, a magnesium-aluminum-silicate-based thixotropic agent; and an organic water-type thixotropic agent such as a xanthan gum, a guar gum, a polyacrylic soda-based thixotropic agent, an acrylic acid/acrylic acid ester copolymer-based thixotropic agent, a polyvinyl-alcohol-based thixotropic agent, a polyethylene-oxide-based thixotropic agent, a urethane-modified polyether-based thixotropic agent, etc. can be cited. One kind or two or more kinds of these can be used.

As the surface activating agent, for example, a surface activating agent such as a nonionic surface activating agent (a polyethylene glycol-based compound, a polyalcohol-based compound, etc.), an anionic surface activating agent (a sulfate-ester-based compound, a sulfonic acid-based compound, a carboxylic acid-based compound, a phosphoester compound, etc.), a cationic surface activating agent (an amine-salt-based compound, a quaternary ammonium-salt-based compound, etc.), an amphoteric surface activating agent (an amine-acid-based compound, a betaine-based compound, etc.) can be cited. One kind or two or more kinds of these can be used.

As a pigment moistening/dispersing agent, for example, a solvent-type pigment moistening/dispersing agent, a water-type pigment moistening/dispersing agent, etc. can be cited. One kind or two or more kinds of these can be used.

As the solvent-type pigment moistening/dispersing agent, for example, a high-molecular-weight compound such as a high-molecular-weight unsaturated polycarboxylate, a polyether/polyester carboxylate, a high-molecular-weight polyester acid polyamine salt, polycarboxylate, amide amine salt of a high-molecular-weight polyester acid, a long-chain polyamino amide phosphoric acid, aliphatic polyamide, salt of long-chain polyamino amide and a high-molecular polyester acid, a high-molecular polyether-based compound; an anionic compound such as phosphate ester, phosphate ester salt, aliphatic alcohol sulfate ester salt, sulfonated oil, alkyl sulfonic acid salt; a cationic compound such as aliphatic amine salt, quaternary ammonium salt, etc. can be cited. One kind or two or more kinds of these can be used.

As the water-type pigment moistening/dispersing agent, for example, high-molecular-weight polycarboxylic salt, styrene-maleic-acid copolymer salt, naphthalenesulfonate formalin condensate, long-chain alkyl organic sulfonic acid salt, lignin sulfonic acid salt, polyphosphoric acid, polysilicic acid salt, long-chain alkyl amine salt, polyethylene glycol derivative, sorbitan fatty acid ester, etc. can be cited. One kind or two or more kinds of these can be used.

As the plasticizer, for example, dimethyl phthalate, diethyl phthalate, dibutyl phthalate, dioctyl phthalate, butyl benzyl phthalate, diisodecyl phthalate, tricresyl phosphate, diphenyl cresyl phosphate, triphenyl dibutyl sebacate phosphate, etc. can be cited. One kind or two or more kinds of these can be used.

As the lubricant, for example, an aliphatic hydrocarbon-based lubricant, a higher aliphatic alcohol/higher fatty acid-based lubricant, a fatty acid-amide-based lubricant, a metal-soap-based lubricant, a fatty-acid-ester-based lubricant, a composite lubricant, etc. can be cited. One kind or two or more kinds of these may be concurrently present. As the light stabilizer, for example, a hindered amine light stabilizer such as bis(1,2,2,6,6-pentamethyl-4-piperidyl) sebacate, methyl 1,2,2,6,6-pentamethyl-4-piperidyl sebacate, bis(2,2,6,6-tetramethyl-1-octyloxy-4-piperidyl) decane—dioate can be cited. One kind or two or more kinds of these can be used.

The pasty composition for aluminum brazing of the present invention can be used in a manner in which a required amount thereof is coated on at least one portion of a surface of an aluminum-containing member, that is, at least a portion to be brazed. As a coating amount in an undried state, 1 to 300 g/m$^2$ is preferable and 1 to 100 g/m$^2$ is more preferable. The coating amount of less than 1 g/m$^2$ is not favorable because the coating amount is insufficient and thereby, a fillet is not likely to be sufficiently formed. On the other hand, if the coating amount exceeds 300 g/m$^2$, overabundance results and thereby, an external appearance obtained after brazing is likely to be impaired. In a case where drying is to be conducted, as an average thickness of a coating film obtained after the drying, 3 to 500 μm is preferable and 10 to 150 μm is more preferable. Although even if the average thickness of a coating film is less than 3 μm, brazing can be conducted, a strength of brazing is likely to be insufficient. On the other hand, if the average thickness of a coating film exceeds 500 μm, overabundance results and may lead to an increase in a manufacturing cost. However, in a case where the pasty composition for aluminum brazing of the present invention is used in order to block holes or fill crevices, the average thickness of a coating film obtained after the drying is not limited to 500 μm and the pasty composition for aluminum brazing of the present invention can be used even when the average thickness of a coating film exceeds 500 μm.

As a method of coating, a heretofore known method can be employed. Brush coating, spray coating, a method using a roll coater, a method using a bar coater, a method using a doctor blade, etc. can be employed. In addition to the above-mentioned methods, a method in which an aluminum-containing member is simply immersed in the pasty composition for aluminum brazing of the present invention may be employed.

In order to dry the pasty composition after the coating, it is only required to conduct the drying at a room temperature in general or at a temperature of 30 to 150° C. according to need. A brazing method is not particularly limited, a heretofore known method can be employed, and a method of brazing in a furnace is particularly favorable. The method of brazing in a furnace allows brazing in large quantity at one time in a labor-saving manner and is suited to industrial production. A temperature of brazing is, though depending on composition of the pasty composition, approximately 450 to 630° C. in general. As for an atmosphere, a nonoxidative atmosphere of a vacuum, Ar, nitrogen, or the like is preferable. As an oxygen concentration of a brazing atmosphere, a concentration of less than or equal to 200 ppm is preferable and a concentration of less than or equal to 100 ppm is desirable. If the oxygen concentration exceeds 200 ppm, defective brazing is likely to be caused due to a reduction in flux action and oxidation of the aluminum alloy powder used as the brazing filler metal.

The pasty composition of the present invention is applicable to aluminum-containing members which can be brazed, and can be used for brazing-joining, for example, fins, pins, pipes, tubes, plates, etc. included in a heat exchanger such as a heater core, an evaporator, and a condenser. In addition, the pasty composition of the present invention is not limited to the heat exchanger but is applicable to a variety of mechanical components, car parts, structural parts, sports goods, office automation appliances, daily commodities, etc.

EXAMPLES

Examples 1 to 2

As an aluminum-containing powder, an alloy powder of Al and 12% by mass of Si was obtained through atomizing a nitrogen gas at a gas pressure of 7 kgf/cm$^2$ and a gas/metal ratio of 2 by using a gas atomizer. The obtained alloy powder of Al and 12% by mass of Si was classified through sieving by using a metal mesh as a screen mesh having an opening of 45 μm, whereby a powder having V(−45) (mass percentage of particles which pass through the screen mesh having an opening of 45 μm) of a value shown in Table 1 was obtained. This powder, a fluoride-based flux (manufactured by Alcan Inc., with a product name Nocolok Flux 100), a butyl rubber binder (manufactured by Exxon Chemical Company, with a product name Exxon Butyl 268), and an organic solvent (toluene) were mixed at percentages shown in Table 1, whereby a pasty composition was prepared. The obtained pasty composition was evaluated and a result thereof is shown in Table. 1.

Examples 3 to 4

As an aluminum-containing powder, an alloy powder of Al and 12% by mass of Si was obtained through atomizing a nitrogen gas at a gas pressure of 10 kgf/cm$^2$ and a gas/metal ratio of 4 by using a gas atomizer. The obtained alloy powder of Al and 12% by mass of Si was classified through sieving by using a metal mesh as a screen mesh having an opening of 45 μm, whereby a powder having V(−45) of a value shown in Table 1 was obtained. This powder, a fluoride-based flux (manufactured by Alcan Inc., with a product name Nocolok Flux 100), a butyl rubber binder (manufactured by Exxon Chemical Company, with a product name Exxon Butyl 268), and an organic solvent (toluene) were mixed at percentages shown in Table 1, whereby a pasty composition was prepared. The obtained pasty composition was evaluated and a result thereof is shown in Table. 1.

Examples 5 to 6

As an aluminum-containing powder, an alloy powder of Al and 12% by mass of Si was obtained through atomizing a nitrogen gas at a gas pressure of 5 kgf/cm$^2$ and a gas/metal ratio of 1 by using a gas atomizer. The obtained alloy powder of Al and 12% by mass of Si was classified through sieving by using a metal mesh as a screen mesh having an opening of 45 μm, whereby a powder having V(−45) of a value shown in Table 1 was obtained. This powder, a fluoride-based flux (manufactured by Alcan Inc., with a product name Nocolok Flux 100), a butyl rubber binder (manufactured by Exxon Chemical Company, with a product name Exxon Butyl 268), and an organic solvent (toluene) were mixed at percentages shown in Table 1, whereby a pasty composition was prepared. The obtained pasty composition was evaluated and a result thereof is shown in Table. 1.

Comparison Examples 1 to 2

As an aluminum-containing powder, an alloy powder of Al and 12% by mass of Si was obtained through atomizing a nitrogen gas at a gas pressure of 20 kgf/cm$^2$ and a gas/metal ratio of 10 by using a gas atomizer. The obtained alloy powder of Al and 12% by mass of Si was classified through sieving by using a metal mesh as a screen mesh having an opening of 45 μm, whereby a powder having V(−45) of a value shown in Table 1 was obtained. By using this powder, in the same manner as in Examples 1 to 2, a pasty composition was prepared. The obtained pasty composition was evaluated and a result thereof is shown in Table. 1.

Comparison Examples 3 to 4

As an aluminum-containing powder, an alloy powder of Al and 12% by mass of Si was obtained through atomizing a nitrogen gas at a gas pressure of 10 kgf/cm² and a gas/metal ratio of 10 by using a gas atomizer. The obtained alloy powder of Al and 12% by mass of Si was classified through sieving by using a metal mesh as a screen mesh having an opening of 45 μm, whereby a powder having V(−45) of a value shown in Table 1 was obtained. By using this powder, in the same manner as in Examples 3 to 4, a pasty composition was prepared. The obtained pasty composition was evaluated and a result thereof is shown in Table. 1.

Comparison Examples 5 to 6

As an aluminum-containing powder, an alloy powder of Al and 12% by mass of Si was obtained through atomizing a nitrogen gas at a gas pressure of 5 kgf/cm² and a gas/metal ratio of 10 by using a gas atomizer. The obtained alloy powder of Al and 12% by mass of Si was classified through sieving by using a metal mesh as a screen mesh having an opening of 45 μm, whereby a powder having V(−45) of a value shown in Table 1 was obtained. By using this powder, in the same manner as in Examples 5 to 6, a pasty composition was prepared. The obtained pasty composition was evaluated and a result thereof is shown in Table. 1.

Conventional Example

A commercially available pure aluminum powder having an average particle diameter of 8 μm (with a purity of 99.9% by mass) and a silicon powder having an average particle diameter of 4.8 μm (with a purity of 99.9% by mass) were mixed in the proportion of one to one for 30 minutes by using a V-blender, whereby an aluminum-mixed powder having characteristics shown in Table 1 was obtained. This mixed powder, a fluoride-based flux (manufactured by Alcan Inc., with a product name Nocolok Flux 100), a butyl rubber binder (manufactured by Exxon Chemical Company, with a product name Exxon Butyl 268), and an organic solvent (toluene) were mixed at percentages shown in Table 1, whereby a pasty composition was prepared. The obtained pasty composition was evaluated and a result thereof is shown in Table. 1.

Note that the properties shown in Table 1 were evaluated as follows. In Table 1, it is indicated that underlined values are out of the scope of the present invention.

(D(10), D(50), D(90))

Figure 2:
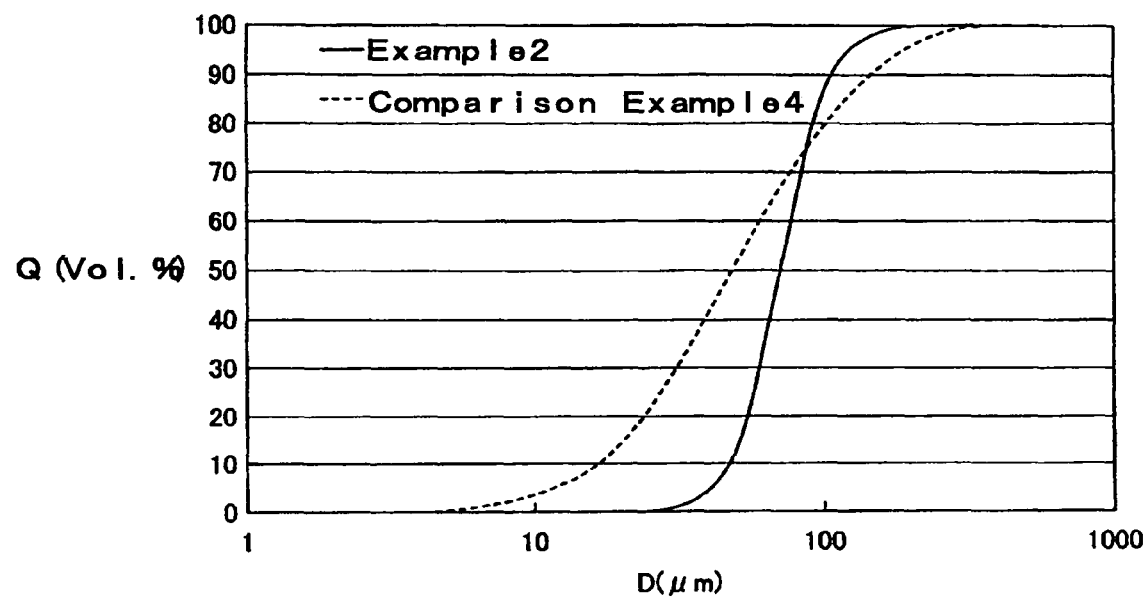
FIG. 2 is a diagram showing one example of a cumulative grading curve of an aluminum-containing powder.

On a cumulative grading curve plotted in a graph in which Q volume % showing a percentage of a volume of particles, in the aluminum-containing powder, whose particle diameter is less than or equal to D μm is represented with a horizontal axis showing D μm and a vertical axis showing Q volume %, the particle diameter D μm which corresponds to the Q volume % is indicated as D(Q) μm. Cumulative grading curves obtained in Example 2 and Comparison Example 4 are exemplarily shown in FIG. 2.

Note that a particle diameter was measured by using a laser diffraction-type particle size analyzer (made by Honeywell Inc., with a product name Microtrack HRA).

(V(−45))

A value of V(−45) (a mass percentage of particles which pass through a screen mesh having an opening of 45 μm) was calculated from a mass B of the aluminum-containing powder which had passed through a JIS metal mesh for sieving, which is made of stainless alloy and has an opening of 45 μm, and a mass A of the aluminum-containing powder before passing through the metal mesh by using the following equation.

$V(-45) = (B/A) \times 100 (\%)$ (Flowability)

Based on JIS Z-2502, a time period required for 50 g of the powder to pass through an orifice having a diameter of 2.63 mm was obtained.

(Smoothness of Paste)

By making visual observations, smoothness of the pasty composition was assessed in accordance with the following criteria.

A: Very smooth and glossy on a surface thereof

B: Smooth but less glossy.

C: Not glossy on the surface thereof and rough on a surface of the paste.

(Carbon Residue)

The prepared pasty composition was coated by using a brush on one side of a 3003 aluminum plate (60×50×2 mm) (with 100 μm of an average thickness of a coating film obtained after drying); thereafter, in order to completely evaporate the diluent organic solvent (toluene), heating was conducted for five minutes at a temperature of 105° C.; the coated plate obtained after the drying was covered with an aluminum foil; the coated plate covered with the aluminum foil (in a closed state) was retained in a furnace of a nitrogen gas atmosphere (nitrogen gas flow of 4 Nm³/hour) for five minutes at a temperature of 530° C. and cooled; thereafter, the coated plate was taken out from the furnace; and a surface of the brazed portion was visually observed. A state of carbon residue was assessed in accordance with the following criteria.

A: No black tarnishing at all.

B: A few black-tarnished spots but not at a concerned level.

C: Clearly black-tarnished spots but less than half of the whole.

D: Half or more of the whole was black-tarnished.

E: The whole was black-tarnished with no commercial value.

(Fillet Formation)

As shown in FIG. 1, a 3003 aluminum plate 2 was perpendicularly set up on a center of the coated surface of the coated plate 1 prepared as mentioned above and temporarily fastened with a wire made of stainless steel, and thereafter, was retained in a furnace of a nitrogen gas atmosphere (nitrogen gas flow of 4 Nm³/hour) for three minutes at a temperature of 600° C., whereby brazing was conducted. After cooling, the coated plate 1 having the 3003 aluminum plate 2 brazed thereon was taken out from the furnace. In order to evaluate forming properties of a fillet 3 of the brazed portion, a throat thickness d shown in FIG. 1 was measured. At a plurality of portions along a direction perpendicular to a plane shown as a face of FIG. 1, throat thicknesses were measured and a maximum value and a minimum value among the measured throat thicknesses were obtained. The fillet forming properties were evaluated from the obtained maximum throat thickness (dmax) and minimum throat thickness, (dmin) in accordance with the following equation.

dmin/dmax=fillet forming properties (%)

A: A fillet forming state is favorable (fillet forming properties: greater than or equal to 80%)

B: A fillet is formed but slightly uneven (fillet forming properties: 50 to 79%).

C: A fillet is formed but considerably uneven (fillet forming properties: 30 to 49%).

D: A fillet is not sufficiently formed and a fracture has occurred (fillet forming properties: 0 to 29%).

TABLE 1

| | | Example | | | | | | Comparison Example | | | | | | Conventional Example |
|---|---|---|---|---|---|---|---|---|---|---|---|---|---|---|
| | | (1) | (2) | (3) | (4) | (5) | (6) | (1) | (2) | (3) | (4) | (5) | (6) | |
| Aluminum-containing powder | Mixed amount (% by mass) | 45.0 | 50.0 | 45.0 | 50.0 | 45.0 | 50.0 | 45.0 | 50.0 | 45.0 | 50.0 | 45.0 | 50.0 | 40.0 |
| | D(50) (μm) | 80 | 80 | 45 | 45 | 100 | 100 | 15.0 | 15.0 | 60 | 60 | 100 | 100 | 6 |
| | D(90)/D(10) | 2.3 | 2.3 | 2.9 | 2.9 | 2.0 | 2.0 | 9.8 | 9.8 | 8.5 | 8.5 | 7.6 | 7.6 | 10.5 |
| | V(−45) (% by mass) | 21.4 | 21.4 | 43.8 | 43.8 | 13.3 | 13.3 | 85.3 | 85.3 | 40.0 | 40.0 | 20.0 | 20.0 | 99.9 |
| | Flowability (second/50 g) | 45 | 45 | 65 | 65 | 40 | 40 | Not flowable | Not flowable | 90 | 90 | 75 | 75 | Not flowable |
| Mixed amount of fluoride-based flux (% by mass) | | 15.0 | 16.7 | 15.0 | 16.7 | 15.0 | 16.7 | 15.0 | 16.7 | 15.0 | 16.7 | 15.0 | 16.7 | 20.0 |
| Mixed amount of binder (% by mass) | | 3.6 | 3.0 | 3.6 | 3.0 | 3.6 | 3.6 | 3.6 | 3.0 | 3.6 | 3.0 | 3.6 | 3.6 | 3.6 |
| Mixed amount of organic solvent (% by mass) | | 36.4 | 30.3 | 36.4 | 30.3 | 36.4 | 36.4 | 36.4 | 30.3 | 36.4 | 30.3 | 36.4 | 36.4 | 36.4 |
| Smoothness of paste | | A | A | A | A | A | A | C | C | A | A | B | B | B |
| Carbon residue | | A | A | A | A | A | A | A | A | A | A | A | A | A |
| Fillet formation | | A | A | A | A | A | A | D | C | B | B | B | B | B |

It is understood from the result shown in Table 1 that by using the pasty compositions for aluminum brazing of the examples of the present invention, an external appearance of a fillet obtained after the brazing can be made favorable without causing black-tarnishing.

The described embodiment and examples are to be considered in all respects only as illustrative and not restrictive. It is intended that the scope of the invention is, therefore, indicated by the appended claims rather than the foregoing description of the embodiment and examples and that all modifications and variations coming within the meaning and equivalency range of the appended claims are embraced within their scope.

INDUSTRIAL APPLICABILITY

The pasty composition of the present invention is applicable to aluminum-containing members which can be brazed, and can be used for brazing-joining, for example, fins, pins, pipes, tubes, plates, etc. included in a heat exchanger such as a heater core, an evaporator, and a condenser. In addition, the pasty composition of the present invention is not limited to the heat exchanger but is applicable to a variety of mechanical components, car parts, structural parts, sports goods, office automation appliances, daily commodities, etc.

The invention claimed is:

1. A pasty composition for aluminum brazing, containing an aluminum-containing powder,
   wherein in a case where on a cumulative grading curve plotted in a graph in which Q volume % showing a percentage of a volume of particles, in the aluminum-containing powder, whose particle diameter is each less than or equal to D μm is represented with a horizontal axis showing D μm and a vertical axis showing Q volume %, the particle diameter D μm which corresponds to the Q volume % is indicated as D(Q) μm, D(50) μm is greater than or equal to 20 μm and less than or equal to 150 μm; and D(90) μm/D(10) μm is less than or equal to 5,
   wherein a mass percentage of particles, in the aluminum-containing powder, which pass through a screen mesh having an opening of 45 μm is less than or equal to 50%, and
   wherein a flowability of the aluminum-containing powder is less than or equal to 80 seconds/50 g.

2. The pasty composition for aluminum brazing according to claim 1, containing the aluminum-containing powder of greater than or equal to 10% by mass and less than or equal to 70% by mass, a fluoride-based flux of greater than or equal to 2% by mass and less than or equal to 50% by mass, and a binder of greater than or equal to 1% by mass and less than or equal to 15% by mass, wherein a remainder thereof includes substantially an organic solvent.

3. The pasty composition for aluminum brazing according to claim 2, wherein the binder contains at least one selected from the group consisting of a butyl rubber, a petroleum resin, an acrylic resin, and an alkyd resin.

4. The pasty composition for aluminum brazing according to claim 1, wherein the aluminum-containing powder is one of an aluminum-silicon-based alloy powder and an aluminum-silicon-zinc-based alloy powder.

5. The pasty composition for aluminum brazing according to claim 1, wherein the aluminum-containing powder is one of a mixed powder of an aluminum powder and a silicon powder; and a mixed powder of an aluminum powder, a silicon powder, and a zinc powder.

6. The pasty composition for aluminum brazing according to claim 1, further containing a coupling agent.

7. An aluminum-containing member coated with the pasty composition for aluminum brazing according to claim 1 on a surface of at least one portion thereof.

8. A method for brazing aluminum-containing members, wherein the pasty composition for aluminum brazing according to claim 1 is applied on a surface of at least one portion of one of the aluminum-containing members and thereafter, said one and the other of the aluminum-containing members are brazed.

* * * * *